(12) United States Patent
Ramachandran (10) Patent No.: US 9,275,450 B2
(45) Date of Patent: Mar. 1, 2016

(54) HIGH ACCURACY DESIGN BASED CLASSIFICATION

(71) Applicant: KLA-Tencor Corporation, Milpitas, CA (US)

(72) Inventor: Vijayakumar Ramachandran, Sunnyvale, CA (US)

(73) Assignee: KLA-Tencor Corp., Milpitas, CA (US)

( * ) Notice: Subject to any disclaimer, the term of this patent is extended or adjusted under 35 U.S.C. 154(b) by 5 days.

(21) Appl. No.: 14/191,202

(22) Filed: Feb. 26, 2014

(65) Prior Publication Data

US 2014/0301629 A1   Oct. 9, 2014

Related U.S. Application Data

(60) Provisional application No. 61/810,045, filed on Apr. 9, 2013.

(51) Int. Cl.
*G06K 9/00* (2006.01)
*G06T 7/00* (2006.01)

(52) U.S. Cl.
CPC ..... *G06T 7/0004* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| 8,751,976 | B2 * | 6/2014 | Tsai et al. | 716/53 |
| 2009/0122303 | A1 | 5/2009 | Nakano et al. | |
| 2011/0170091 | A1 | 7/2011 | Chang et al. | |
| 2012/0155740 | A1 * | 6/2012 | Cho et al. | 382/149 |
| 2012/0308112 | A1 * | 12/2012 | Hu et al. | 382/149 |
| 2013/0070078 | A1 * | 3/2013 | Takagi et al. | 348/80 |

FOREIGN PATENT DOCUMENTS

| KR | 10-2005-0120420 | 12/2005 |
| KR | 10-2010-0073374 | 7/2010 |
| KR | 10-2012-0035422 | 4/2012 |

OTHER PUBLICATIONS

International Search Report and Written Opinion for PCT/US2014/033549 mailed Jul. 30, 2014.

* cited by examiner

*Primary Examiner* — Daniel Mariam
(74) *Attorney, Agent, or Firm* — Ann Marie Mewherter (57) ABSTRACT

Systems and methods for classifying defects on a wafer are provided. One method includes dilating an extended bounding box (EBB) surrounding a defect position on a wafer in two dimensions in proportion to a width and height of a pattern of interest (POI) for a hot spot closest to the defect position. The method also includes determining if polygons in the POI match polygons in the dilated bounding box. If the polygons in the POI do not match the polygons in the dilated bounding box, the defect is classified as a non-hot spot defect. If the polygons in the POI match the polygons in the dilated bounding box, the defect is classified as a hot spot defect if the area of the EBB intersects the area of interest associated with the hot spot and a non-hot spot defect if the EBB area does not intersect the area of interest.

42 Claims, 4 Drawing Sheets

HIGH ACCURACY DESIGN BASED CLASSIFICATION

BACKGROUND OF THE INVENTION

1. Field of the Invention

The present invention generally relates to systems and methods for classifying defects detected on a wafer.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

A design "hot spot" is a well-defined structure or rule within the design that has been identified as a relatively high risk for failure, either through simulations, defect inspection, or electrical testing. Hot spots are often due to optical proximity effects. For example, when a lithography tool such as a scanner "prints" a wafer, structures that are relatively close to each other can interact optically (meaning that the printing of one structure can affect the printing of another structure due to their proximity). This interaction can elevate the risk of failure at a particular location. Two structures may be considered to be "close" to one another if they are within a few multiples of the wavelength of light used to print the wafer (e.g., about 200 nm to about 250 nm).

Current methods of identifying whether a defect "belongs" to a hot spot assume that the coordinate accuracy of the inspection tool used to detect the defect is wider than the bounds of the polygons that define the hot spot. However, the coordinate accuracy of many modern optical and scanning electron microscope (SEM) imaging tools can often be smaller than the bounds of the hot spots. When current methods for identifying whether a defect belongs to a hot spot are applied to one of these modern tools, it effectively negates the advantages provided by the improved coordinate accuracy of these tools.

Accordingly, it would be advantageous to develop systems and methods for classifying defects detected on a wafer that do not have one or more of the disadvantages described above.

SUMMARY OF THE INVENTION

The following description of various embodiments is not to be construed in any way as limiting the subject matter of the appended claims.

One embodiment relates to a method for classifying defects detected on a wafer. The method includes acquiring information for a defect detected on a wafer. The information includes a position of the defect on the wafer. The method also includes creating an extended bounding box (EBB) surrounding the position of the defect. In addition, the method includes dilating the EBB in two dimensions in proportion to a width and a height of a pattern of interest (POI) for a hot spot closest to the position of the defect to create a dilated bounding box that includes polygons in an area of the wafer defined by the dilated bounding box. The method further includes determining if polygons in the POI match the polygons in the dilated bounding box. If the polygons in the POI are determined to not match the polygons in the dilated bounding box, the method includes classifying the defect as a non-hot spot defect. If the polygons in the POI are determined to match the polygons in the dilated bounding box, the method includes determining if the area of the EBB intersects an area of interest associated with the hot spot. If the area of the EBB intersects the area of interest associated with the hot spot, the method includes classifying the defect as a hot spot defect. If the area of the EBB does not intersect the area of interest associated with the hot spot, the method includes classifying the defect as a non-hot spot defect. The acquiring step, the creating step, the dilating step, the determining steps, and the classifying steps are performed by one or more computer systems.

Each of the steps of the method may be further performed as described herein. In addition, the method may include any other step(s) of any other method(s) described herein. Furthermore, the method may be performed by any of the systems described herein.

Another embodiment relates to a non-transitory computer-readable medium storing program instructions executable on a computer system for performing a computer-implemented method for classifying defects detected on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to classify defects detected on a wafer. The system includes an inspection subsystem configured for detecting a defect on a wafer and generating information for the defect on the wafer. The information includes a position of the defect on the wafer. The system also includes a computer subsystem configured for performing the steps of the method described above. The system may be further configured as described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a method for classifying defects detected on a wafer. The embodiments described herein provide improved hot spot defect identification and take full advantage of the improved defect coordinate accuracy that inspection tools can provide. Therefore, the embodiments described herein can have a direct positive impact on the effectiveness of defect inspection in monitoring known hot spots and consequently on yield for semiconductor manufacturers. In certain instances, the method is described as being performed for "one" or "a" defect. However, this is not a limit of the embodiments described herein. For example, the method may be performed to classify one, some (i.e., only a portion of or less than all of the defects), or all of the defects detected on a wafer.

In currently used methods for identifying if a given defect belongs to a known hot spot, a rectangle may be drawn in a design for a hot spot. All the design polygons inside the rectangle are considered to be part of a pattern of interest (POI) for the hot spot. Design polygons are polygons that define and represent the structures in the design that will be formed on a wafer. Once a defect is detected, another rectangle may be drawn surrounding and centered on the defect position. The half-width of this rectangle is equal to the uncertainty of the defect location. This rectangle is referred to herein as an "extended bounding box" (EBB), but it may be referred to by any other name. A design clip may be extracted at the location of the detected defect. The design clip can be extracted from design data such as graphical data stream (GDS) data for the design. If a portion of the POI for a hot spot overlaps any portion of the EBB for a defect, then that defect is flagged as belonging to that hot spot.

The term "design data" as used herein generally refers to the physical design (layout) of an IC and data derived from the physical design through complex simulation or simple geometric and Boolean operations. The design data may be stored in a data structure such as a GDS file, any other standard machine-readable file, any other suitable file known in the art, and a design database. A GDSII file is one of a class of files used for the representation of design layout data. Other examples of such files include GL1 and OASIS files. The design data used in the embodiments described herein may be stored in any of this entire class of files irrespective of data structure configuration, storage format, or storage mechanism.

Figure 1:
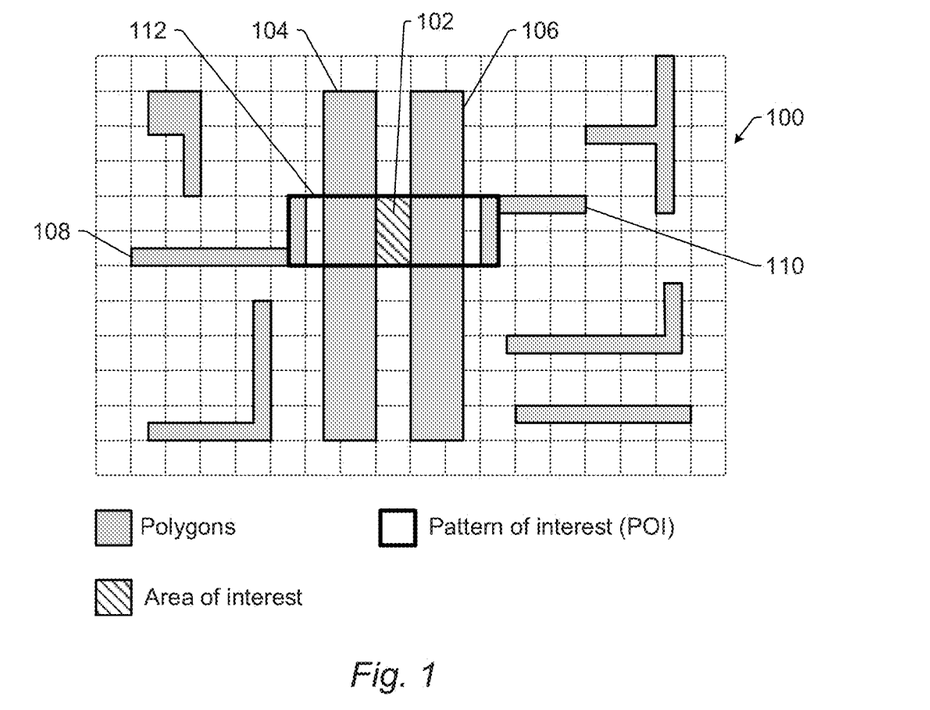
FIG. 1 is a schematic diagram illustrating a plan view of one example of design polygons and a pattern of interest (POI) for a hot spot and an area of interest associated with the hot spot.

FIG. 1 shows an example design 100 with a defined hot spot. The hot spot in this example includes area of interest 102 that is created in the middle of two relatively thick lines 104 and 106 because of the presence of two relatively thin lines 108 and 110 at different distances from the thick lines and on either side of the thick lines. Therefore, area of interest 102 is the region where we are looking for a defect. The example shown in FIG. 1 is meant to be an arbitrary set of design polygons that define no particular design.

Box 112 encloses all the polygons that define the "POI" for the hot spot. Therefore, box 112 is the bounding box around the polygons that define the area of interest associated with the hot spot. In some instances, a user may define the POI as the bounding box of all polygons that define the area of interest associated with the hot spot. Therefore, the user may specify both the POI and the area of interest. Notice that if the portions of the two relatively thin lines 108 and 110 on the ends of box 112 that encloses the POI are not included in the POI, then the POI will match every location in the middle of the two relatively thick lines. Hence, the POI are preferably defined to include sufficient polygons such that the POI can be used to identify the location of the hot spot with relatively high accuracy, but the POI also preferably includes only the minimum number or amount of polygons to do so. In other words, the POI is preferably defined using the minimum number or amount of polygons to define the hot spot with reasonable accuracy. For example, in one embodiment, the polygons in the POI are selected from a design for the wafer by identifying polygons that can be uniquely identified in an area proximate the hot spot and minimizing a width and a height of an area that encloses the identified polygons. The area proximate the hot spot may be roughly the area of the design or wafer that will be processed together to identify the POI. For example, the area proximate the hot spot may be roughly an area of a job frame or frame image of the wafer that will be processed as an entirety by a defect detection method or the embodiments described herein.

Figure 2:
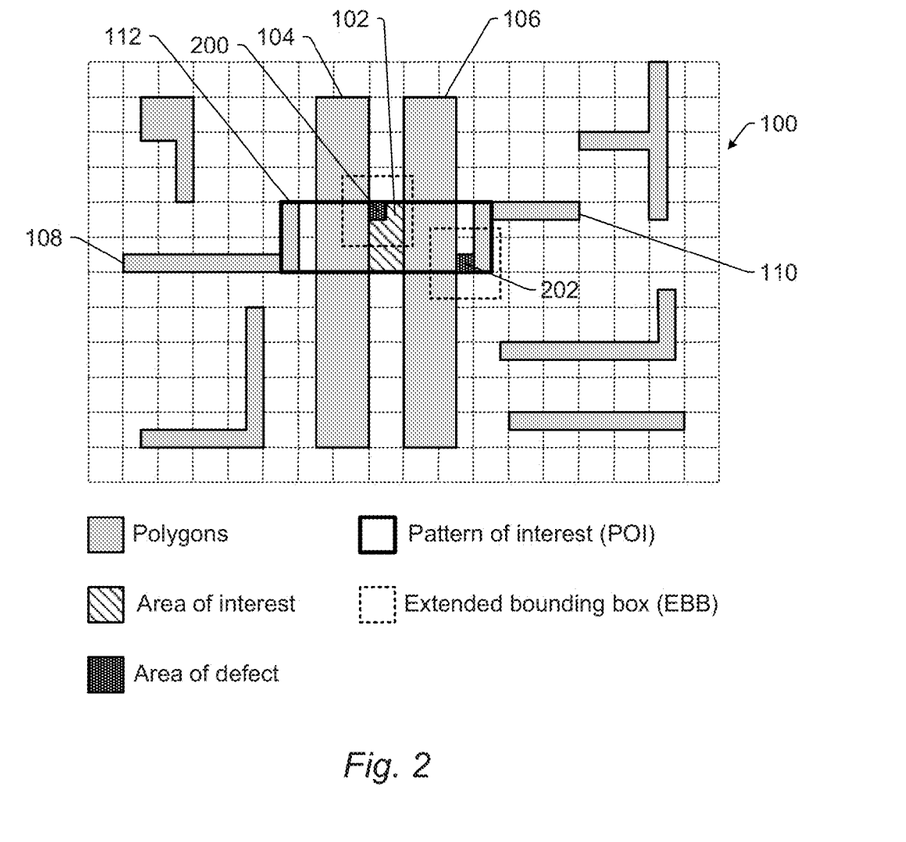
FIG. 2 is a schematic diagram illustrating a plan view of the design polygons, POI, and area of interest of FIG. 1 with two examples of defects on a wafer.

FIG. 2 shows the vicinity of the hot spot of FIG. 1 with two defects, one defect 200 that is in the area of interest associated with the hot spot and the other defect 202 that is outside the area of interest associated with the hot spot. The boxes shown in FIG. 2 with dashed lines that surround each defect show the uncertainty in the defect location and are referred to herein as the "extended bounding boxes" or "EBB" for each defect. The challenge in wafer inspection is to distinguish between the two defects and to correctly identify defect 200 as belonging to the hot spot and defect 202 as not belonging to the hot spot.

If the uncertainty in the defect location is substantially large compared to the POI, then the two defects shown in FIG. 2 cannot be separated as one belonging to the hot spot and the other not. The embodiments described further herein, however, can be used to separate defects belonging to a hot spot from defects that do not belong to the hot spot in cases in which an inspection system shrinks the location uncertainty of detected defects sufficiently so that the EBB is smaller or comparable to the POI in size. For example, in one embodiment, the area of the EBB is approximately equal to an area of the POI. In another embodiment, creating the EBB as described further herein includes determining dimensions of the EBB based on an uncertainty in the position of the defect, and the position of the defect is reported by an inspection system that detected the defect on the wafer. For example, the EBB size may be equal to defect size plus uncertainty in the defect position. In an additional embodiment, the position of the defect on the wafer is a position reported by an inspection system that detected the defect on the wafer, and a coordinate inaccuracy of the inspection system is smaller than a height and a width of the hot spot. Data from semiconductor manufacturing facilities or "fabs" has shown this to be true in a number of cases for the latest generation of inspection systems, which have substantially high coordinate accuracy and hence substantially small EBB.

The current approach for defect classification relies on taking all the polygons that intersect the EBB in its entirety and then searching to see if the POI exists in them. Since the EBB of both defects in the example shown in FIG. 2 intersect only a subset of the polygons, neither defect would be flagged as belonging to the hot spot. Notice, however, that increasing the size of the EBB artificially will cause both defects to be flagged as belonging to the hot spot. Therefore, increasing the size of the EBB artificially will not provide the ability to distinguish between the defect belonging to the hot spot and the one that does not. As such, increasing the EBB essentially buys some functionality at the expense of sacrificing fidelity.

The method includes acquiring information for a defect detected on a wafer, and the information includes a position of the defect on the wafer. In one embodiment, acquiring the information for the defect detected on the wafer includes acquiring the information for the defect from an inspection system that detected the defect on the wafer. For example, acquiring the information may include performing a wafer inspection using a wafer inspection system such as any of the inspection systems described herein. However, acquiring the information may include acquiring the information from a storage medium (such as a fab database) in which a wafer inspection system or a computer system has stored the information. In this manner, acquiring the information for the defect does not necessarily include performing an inspection of the wafer. The information for the defect may be information included in inspection results for the wafer, which may include information for more than one (or all) of the defects detected on the wafer. Acquiring the information may also include acquiring information for more than one defect detected on the wafer. The information for the position of the defect on the wafer may include any suitable such information such as wafer coordinates for the defect, area for the defect, etc.

Figure 3:
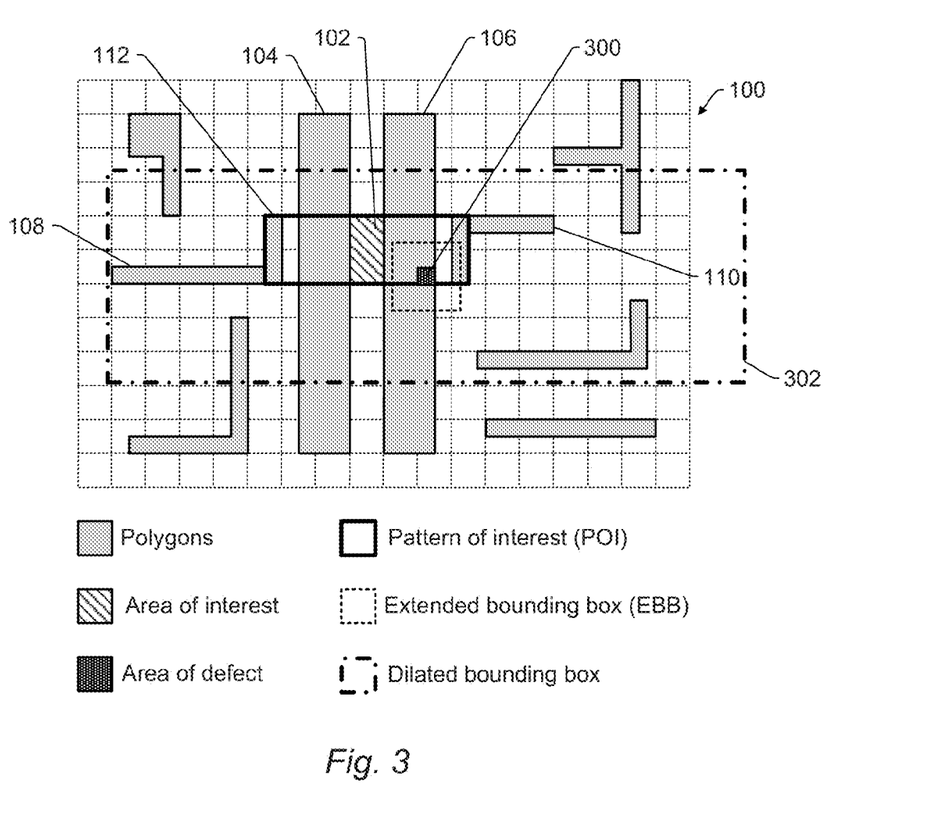
FIG. 3 is a schematic diagram illustrating a plan view of the design polygons, POI, and area of interest of FIG. 1 with one embodiment of a dilated bounding box.

The method may also include acquiring information for hot spots on the wafer and POIs for the hot spots. When a user sets up a hot spot library, they may specify both the POI (box 112 shown in FIGS. 1-3) and the hot spot region (e.g., the area of interest 102). Therefore, the method may include acquiring the information for the hot spots, the POIs, and the areas of interest from such a hot spot library or in any other manner. In one embodiment, therefore, the POI and the area of interest associated with the hot spot are determined by another method, and the method includes acquiring information for the POI, the area of interest, and the hot spot from a storage medium in which the other method has stored the information. In one embodiment, the area of interest associated with the hot spot is located within the POI, as shown in FIGS. 1-3. However, there is no requirement for the hot spot region to be within the bounds of the POI. For example, in another embodiment, the area of interest associated with the hot spot is not located within the POI. In one such example, the hot spot area of interest can be some region relatively close to the POI. In particular, although the area of interest is shown in the example of FIGS. 1-3 as being completely enclosed within the POI, the proposed methods will work just as well even if the area of interest is outside of the POI as long as it is in the proximity of the POI (e.g., the same inspection frame) and is at a fixed relative distance from the POI. In addition, an area of interest associated with a hot spot may be an area of interest within or close to the hot spot.

In one embodiment, acquiring the information for the defect detected on the wafer includes performing an inspection on the wafer in which defects are detected without using information about hot spots for the wafer. In another embodiment, acquiring the information for the defect detected on the wafer includes performing an inspection on the wafer in which information about hot spots for the wafer is used to determine care areas on the wafer in which the inspection is performed. For example, hot spots can be used in two different ways. One way is to find out if a defect detected by an inspection system is in a hot spot. Another way is to find all occurrences of the POI in the design and use this as a "care area," that is inspected preferentially. Any defect caught in these "care areas" is by definition a member of the hot spot. If the POIs are used directly for the hot spots, then there will be a relatively large care area and defects outside of the hot spot region or area of interest can also be flagged as a hot spot defect. However, all occurrences of the POIs on the design can be found and then shrunk so that the care areas cover only the hot spot region or area of interest. This will give a more sensitive inspection since it eliminates false matches that are defects in the POI area outside of the area of interest associated with the hot spot.

Since the methods and systems described herein do not necessarily have to create the information for the hot spots, the areas of interest, and the POIs, the embodiments described herein do not necessarily have to have access to the design data (e.g., GDS data) for the wafer. For example, in one embodiment, the method is performed without using design data for the wafer. Instead, the methods can just use information for the hot spots, areas of interest, and POIs provided by another method or system. Therefore, the embodiments described herein are advantageous over other methods and systems for design based classification that require access to what may be sensitive information (e.g., intellectual property) included in the design data.

The method also includes creating an EBB surrounding the position of the defect. The EBB may be created as described further herein. For example, the area of the EBB may be determined by multiplying the area of the defect by some multiple of the defect position uncertainty of the wafer inspection system.

The method further includes dilating the EBB in two dimensions in proportion to a width and a height of a POI for a hot spot closest to the position of the defect to create a dilated bounding box that includes polygons in an area of the wafer defined by the dilated bounding box. In this manner, when a defect is to be evaluated, its EBB is first dilated by the width and height of the POI in the x and y directions, respectively. For example, as shown in FIG. 3, the EBB for defect 300 may be dilated to create dilated bounding box 302. Therefore, as shown in FIG. 3, the EBB is not dilated in proportion to its own dimensions or area. Instead, it is dilated in proportion to the dimensions or area of the POI. As such, the shape of the dilated bounding box may be different than the shape of the EBB for which it was created. For example, as shown in FIG. 3, the shape of the EBB is a square while the shape of the dilated bounding box is a rectangle. The EBB may be dilated in a similar manner for more complex shapes of the POI (i.e., non-rectangular shapes). The hot spot closest to the position of the defect may be determined in any suitable manner (e.g., by comparing wafer coordinates for the defect to wafer coordinates for hot spots or using design coordinates in a similar manner).

The method further includes determining if polygons in the POI match the polygons in the dilated bounding box. The polygons in the dilated bounding box may be extracted in a number of different ways. For example, in one embodiment, determining if the polygons in the POI match the polygons in the dilated bounding box includes extracting the polygons in the dilated bounding box from an image for the area of the wafer defined by the dilated bounding box, and the image is generated by an inspection system. In one such example, the dilated bounding box may be determined for a defect during inspection such that the image for the area of the wafer defined by the dilated bounding box can be acquired during the inspection with the inspection system. In other words, the image for the dilated bounding box may be acquired on-the-fly. Alternatively, the image for the dilated bounding box may be acquired subsequent to inspection using the inspection system. For example, the defect or defects for which the method described herein is to be performed may be selected from all defects detected on the wafer, and the inspection system may be used to go back to the location(s) of the selected defect(s) to acquire image(s) for the dilated bounding box(es). In another example, the method may use the locations of the selected defect(s) to acquire images for its or their dilated bounding box or boxes from inspection results in which the inspection system has stored the images.

In another embodiment, determining if the polygons in the POI match the polygons in the dilated bounding box includes extracting the polygons in the dilated bounding box from design data for the area of the wafer defined by the dilated bounding box. For example, information about the wafer space position(s) of the defect(s) for which the method is to be performed may be used to determine information about the position(s) of the defect(s) in the design data. The polygons in the design data corresponding to the dilated bounding box(es) at the position(s) of the defect(s) in the design data may then be extracted. The extraction of the polygons, in any of the embodiments, itself may be performed in any suitable manner (e.g., identifying the polygons or portions of the polygons included in the area of the dilated bounding box and then determining any information about the polygons or the portions of the polygons needed to perform the comparison).

In another embodiment, determining if the polygons in the POI match the polygons in the dilated bounding box is performed with all of the polygons in the POI. For example, all of the polygons intersecting the dilated bounding box may be extracted and compared to the POI to find an exact match. In FIG. 3, this set of polygons includes all of the polygons in the original POI definition. In some embodiments, determining if the polygons in the POI match the polygons in the dilated bounding box may include searching for an exact match between the different polygons. However, determining if the polygons in the POI and the dilated bounding box match may include determining how similar the polygons in the POI and the dilated bounding box are and comparing a measure of the similarity to some threshold thereby allowing for matches that are not necessarily exact. Allowing for matches that are not necessarily exact may be advantageous when polygons are being compared from different media (e.g., a comparison of wafer images to design data).

The search for the POI pattern location in the set of extracted polygons establishes the coarse registration of the defect location to the design. For example, if the polygons in the POI are determined to match the polygons in the dilated bounding box, the method may include determining a coarse position of the defect with respect to a design for the wafer based on design coordinates for the polygons in the POI that match the polygons in the dilated bounding box. In the case of FIG. 3, since all of the polygons in the POI are in the set of extracted polygons for the dilated bounding box, there will in fact be a match. If the polygons in the POI are determined to not match the polygons in the dilated bounding box, the method includes classifying the defect as a non-hot spot defect. For example, if there is no match, then this defect can be eliminated. In one embodiment, if the defect is classified as a non-hot spot defect, the method includes eliminating information for the defect from information included in inspection results for the wafer.

If the polygons in the POI are determined to match the polygons in the dilated bounding box, the method includes determining if the area of the EBB intersects an area of interest associated with the hot spot. For example, for defects that are not eliminated in the first comparison described above, a second comparison may be performed to check if the non-dilated EBB of the defect intersects with the area of interest associated with the hot spot. In this manner, if a match is found, the area of interest within the matched region may be found and then if the area of interest is within the EBB area, then the defect is designated as a hot spot defect. Determining if the area of the EBB intersects the area of interest associated with the hot spot may be performed in any suitable manner.

It is noted that the area of interest for this second determining step may be the area of interest described above—namely, the area in which defects for the hot spot are desired to be found. However, the area of interest used in this step can be the portion of the dilated bounding box that matches the POI. Therefore, the second determining step may include determining if the portion of the dilated bounding box that matches the POI overlaps with or intersects the area of the EBB.

If the area of the EBB intersects the area of interest associated with the hot spot, the method includes classifying the defect as a hot spot defect. In other words, if the area of the EBB intersects the area of interest associated with the hot spot, the defect is flagged as a hot spot defect. This comparison establishes the fine registration of the defect location in the design. For example, in one embodiment, if the area of the EBB intersects the area of interest associated with the hot spot, the method includes determining a fine position of the defect with respect to a design for the wafer based on 1) a spatial relationship between the area of the EBB and the area of interest associated with the hot spot and 2) a position of the area of interest associated with the hot spot in the design. In this manner, information about the position of area of interest associated with the hot spot in the design in combination with the spatial relationship between the EBB and the area of interest associated with the hot spot may be used to determine where the defect is within the design.

If the area of the EBB does not intersect the area of interest associated with the hot spot, the method includes classifying the defect as a non-hot spot defect. In this manner, if the area of the EBB does not intersect the area of interest associated with the hot spot, the defect is discarded. Classifying the defect as a non-hot spot defect may be performed as described above.

It is further noted that a defect that falls on a grid immediately adjacent to the area of interest associated with the hot spot will also be flagged as a hot spot defect by this system. This is a limitation of the inspection system's defect location accuracy, but can be overcome by sub-pixel design clip to wafer image alignment. Furthermore, the embodiments described herein can be considered to be supersets of the existing defect classification methods. For example, when the POI and the hot spot are both defined to be the same area on the wafer and therefore include the same design polygons, then the embodiments described herein become an improved version of the existing approaches.

In some instances, two or more hot spots may be relatively close to one another in the design and therefore on the wafer. Therefore, in some instances, if a defect for which the method is performed is determined to not belong to one hot spot, the method may include checking to see if there are any other hot spots relatively close to the defect before the defect is discarded and thereby eliminated from inspection results. For example, in one embodiment, if the defect is classified as the non-spot defect, the method includes comparing a distance between the position of the defect and the next closest hot spot to a threshold and if the distance is less than the threshold, performing the method for the defect and the next closest hot spot. The threshold may be selected by a user or may be determined by the method based on information about the hot spots.

Defect location accuracy of wafer inspection systems is increasing fast and is expected to increase further as applications that leverage the accuracy of the tool get developed and show value for semiconductor manufacturers. Location accuracy is also being improved by advances in wafer image to design clip registration in software. The design rules for semiconductors are also shrinking. However, the wavelength of light used by lithography systems such as scanners has not changed much for some time. This means that even though design rules are shrinking, the size of the POIs may not shrink proportionately. Patterns that are a few multiples of the wavelength of light (i.e., several hundreds of nanometers) will continue to be relevant for defining a hot spot because of primary and secondary order interactions of light during lithography. In this environment, there is great value in being able to fully utilize the improved defect location accuracy of the latest generation tools to provide a yield relevant pareto of hot spot defects that have a substantially low count of false positives in them.

One or more steps of the methods and computer-implemented methods described herein may be performed by one or more computer systems. For example, the acquiring step, the creating step, the dilating step, the determining steps, and the classifying steps may be performed by one or more computer systems, which may be configured as described further herein.

Each of the embodiments of the methods described above may include any other step(s) of any other method(s) described herein. Furthermore, each of the embodiments of the methods described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figures 4, 5:
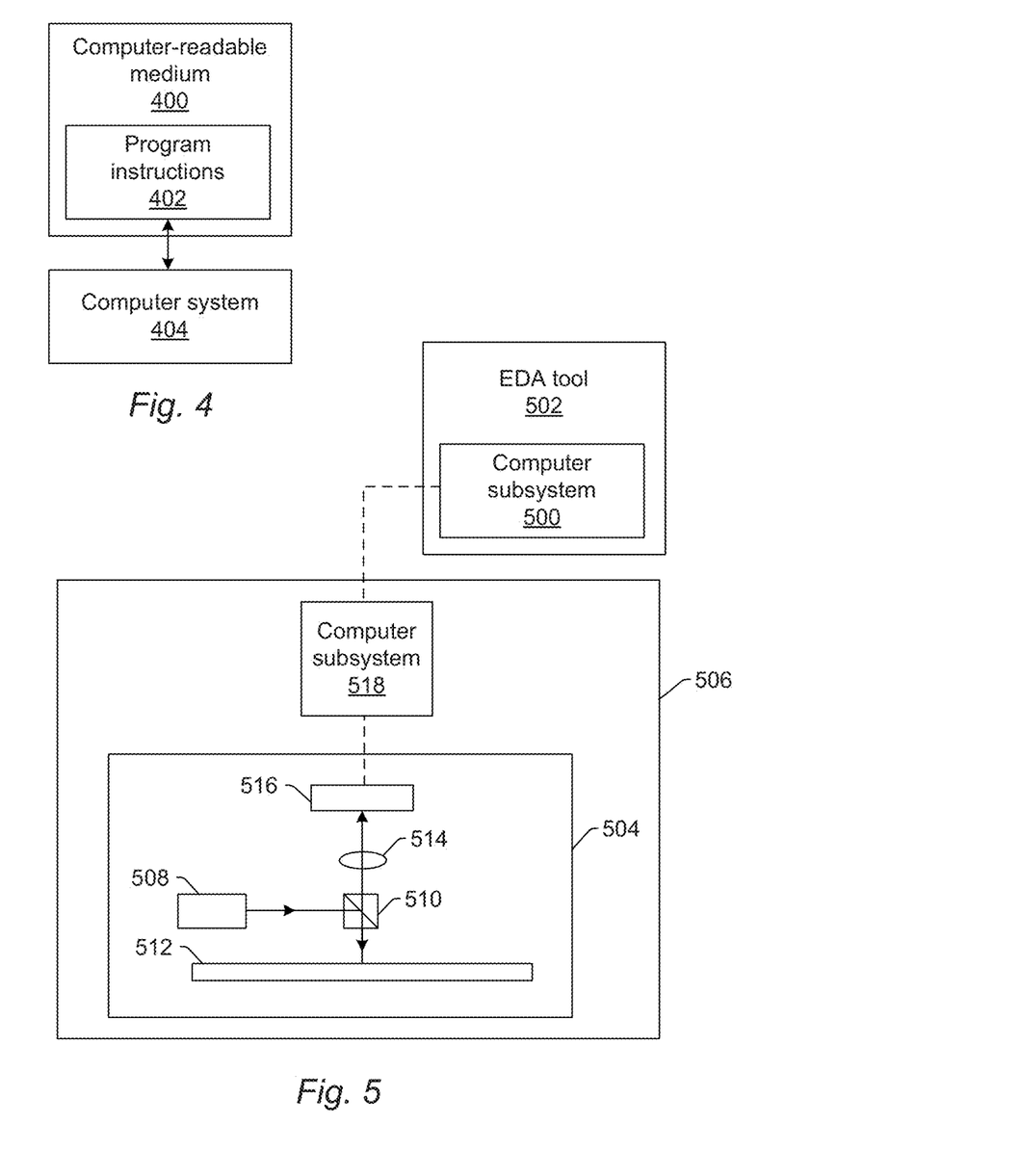
FIG. 4 is a block diagram illustrating one embodiment of a non-transitory computer-readable medium storing program instructions for causing a computer system to perform a computer-implemented method described herein.
FIG. 5 is a schematic diagram illustrating a side view of an embodiment of a system configured to classify defects detected on a wafer.

Another embodiment relates to a non-transitory computer-readable medium storing program instructions executable on a computer system for performing a computer-implemented method for classifying defects detected on a wafer. One such embodiment is shown in FIG. 4. For example, as shown in FIG. 4, non-transitory computer-readable medium 400 stores program instructions 402 executable on computer system 404 for performing a computer-implemented method for classifying defects detected on a wafer. The computer-implemented method may include any step(s) of any method(s) described herein.

Program instructions 402 implementing methods such as those described herein may be stored on non-transitory computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Computer system 404 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

An additional embodiment relates to a system configured to classify defects detected on a wafer. The system may include a computer subsystem configured for creating or generating information for hot spots in a design being formed on the wafer and/or information for POIs and areas of interest associated with the hot spots. The information for the hot spots may include areas of interest associated with the hot spots and locations of areas of interest associated with the hot spots in the design. The information for the POIs may include information for the design polygons or portions of design polygons included in the POIs, dimensions of the POIs, locations of the POIs in the design, etc. The computer subsystem may be configured to perform these steps as described further herein.

In one embodiment, the computer subsystem described above is part of an electronic design automation (EDA) tool, and the inspection subsystem described further herein is not part of the EDA tool. For example, as shown in FIG. 5, the computer subsystem described above may be computer subsystem 500 included in EDA tool 502. The EDA tool and the computer subsystem included in such a tool may include any commercially available EDA tool that can perform the steps described above. Therefore, the computer subsystem that creates the hot spot and POI information described herein may be separate from an inspection subsystem of an inspection tool that is used to inspect the wafer. In other words, the design data may be processed by one system or tool to create the hot spot and POI information that will be used by another, different system or tool to classify defects. The computer subsystem that is used to create the hot spot and POI information also may not be part of an EDA tool and may be included in another system or tool or simply be configured as a stand alone computer system. Furthermore, the tool or computer subsystem that generates the hot spot and POI information may be configured to provide that information to the other tool by storing or transferring the hot spot and POI information to a shared computer-readable storage medium such as a fab database or by transmitting the hot spot and POI information directly to the tool that will use it, which may be performed as described further herein.

The system also includes an inspection subsystem configured for detecting a defect on a wafer and generating information for the defect on the wafer, which includes a position of the defect on the wafer. One embodiment of such an inspection subsystem is shown in FIG. 5 as inspection subsystem 504 of system 506. The inspection subsystem is configured to detect the defect on the wafer by scanning the wafer with light and detecting light from the wafer during the scanning. For example, as shown in FIG. 5, the inspection subsystem includes light source 508, which may include any suitable light source known in the art.

Light from the light source may be directed to beam splitter 510, which may be configured to direct the light from the light source to wafer 512. The light source may be coupled to any other suitable elements (not shown) such as one or more condensing lenses, collimating lenses, relay lenses, objective lenses, apertures, spectral filters, polarizing components and the like. As shown in FIG. 5, the light may be directed to the wafer at a normal angle of incidence. However, the light may be directed to the wafer at any suitable angle of incidence including near normal and oblique incidence. In addition, the light or multiple light beams may be directed to the wafer at more than one angle of incidence sequentially or simultaneously. The inspection subsystem may be configured to scan the light over the wafer in any suitable manner.

Light from wafer 512 may be collected and detected by one or more channels of the inspection subsystem during scanning. For example, light reflected from wafer 512 at angles relatively close to normal (i.e., specularly reflected light when the incidence is normal) may pass through beam splitter 510 to lens 514. Lens 514 may include a refractive optical element as shown in FIG. 5. In addition, lens 514 may include one or more refractive optical elements and/or one or more reflective optical elements. Light collected by lens 514 may be focused to detector 516. Detector 516 may include any suitable detector known in the art such as a charge coupled device (CCD) or another type of imaging detector. Detector 516 is configured to generate output that is responsive to the reflected light collected by lens 514. Therefore, lens 514 and detector 516 form one channel of the inspection subsystem. This channel of the inspection subsystem may include any other suitable optical components (not shown) known in the art. The output of the detector may include, for example, images, image data, signals, image signals, or any other output that can be generated by a detector suitable for use in an inspection system.

Since the inspection subsystem shown in FIG. 5 is configured to detect light specularly reflected from the wafer, the inspection subsystem is configured as a bright field (BF) inspection system. Such an inspection subsystem may, however, also be configured for other types of wafer inspection. For example, the inspection subsystem shown in FIG. 5 may also include one or more other channels (not shown). The other channel(s) may include any of the optical components described herein such as a lens and a detector, configured as a scattered light channel. The lens and the detector may be further configured as described herein. In this manner, the inspection subsystem may also be configured for dark field (DF) inspection.

The inspection subsystem may use output generated by detector 516 and/or any other detectors included in the inspection subsystem to detect the defects on the wafer. For example, the inspection subsystem or a computer subsystem of the inspection system (e.g., computer subsystem 518 described herein) may be configured to subtract the output generated for one die (a reference die) on the wafer from another die (a test die) on the wafer and then compare the result of the subtraction to a threshold. Any subtraction result above the threshold may then be flagged as a defect or a potential defect. The inspection subsystem may however use any other method and/or algorithm to detect the defects on the wafer. The inspection subsystem may be configured to generate the information for the defect in any suitable manner.

The system also includes computer subsystem 518 that is coupled to the inspection subsystem. In this manner, output generated by the inspection subsystem may be provided to computer subsystem 518. Computer subsystem 518 is configured for performing the creating, dilating, determining, and classifying steps described herein. In addition, computer subsystem 518 may be configured to perform any other steps described herein.

The computer subsystem of the inspection system may also be coupled to the other computer subsystem that is not part of the inspection system such as computer subsystem 500, which may be included in another tool such as the EDA tool described above such that computer subsystem 518 can receive output generated by computer subsystem 500, which may include the information for the hot spots for the wafer being inspected. For example, the two computer subsystems may be effectively coupled by a shared computer-readable storage medium such as a fab database or may be coupled by a transmission medium such as that described above such that information may be transmitted between the two computer subsystems.

It is noted that FIG. 5 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection subsystem (e.g., by adding functionality described herein to an existing inspection system) such as the 29xx/28xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system. Furthermore, although the system is described herein as being an optical or light-based inspection system, the inspection subsystem may be configured as an electron beam based inspection subsystem. The electron beam based inspection subsystem may be any suitable electron beam based inspection subsystem included in any suitable commercially available electron beam inspection system.

Further modifications and alternative embodiments of various aspects of the invention will be apparent to those skilled in the art in view of this description. For example, systems and methods for classifying defects detected on a wafer are provided. Accordingly, this description is to be construed as illustrative only and for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for classifying defects detected on a wafer, comprising:

acquiring information for a defect detected on a wafer, wherein the information comprises a position of the defect on the wafer;

creating an extended bounding box surrounding the position of the defect;

dilating the extended bounding box in two dimensions in proportion to a width and a height of a pattern of interest for a hot spot closest to the position of the defect to create a dilated bounding box that includes polygons in an area of the wafer defined by the dilated bounding box; and determining if polygons in the pattern of interest match the polygons in the dilated bounding box;

if the polygons in the pattern of interest are determined to not match the polygons in the dilated bounding box, classifying the defect as a non-hot spot defect; and if the polygons in the pattern of interest are determined to match the polygons in the dilated bounding box, determining if the area of the extended bounding box intersects an area of interest associated with the hot spot;

if the area of the extended bounding box intersects the area of interest associated with the hot spot, classifying the defect as a hot spot defect; and if the area of the extended bounding box does not intersect the area of interest associated with the hot spot, classifying the defect as a non-hot spot defect, wherein the acquiring step, the creating step, the dilating step, the determining steps, and the classifying steps are performed by one or more computer systems.

2. The method of claim 1, wherein the pattern of interest and the area of interest associated with the hot spot are determined by another method, and wherein the method further comprises acquiring information for the pattern of interest, the area of interest, and the hot spot from a storage medium in which the other method has stored the information.

3. The method of claim 1, wherein the method is performed without using design data for the wafer.

4. The method of claim 1, wherein the area of interest associated with the hot spot is located within the pattern of interest.

5. The method of claim 1, wherein the area of interest associated with the hot spot is not located within the pattern of interest.

6. The method of claim 1, wherein determining if the polygons in the pattern of interest match the polygons in the dilated bounding box comprises extracting the polygons in the dilated bounding box from an image for the area of the wafer defined by the dilated bounding box, and wherein the image is generated by an inspection system.

7. The method of claim 1, wherein determining if the polygons in the pattern of interest match the polygons in the dilated bounding box comprises extracting the polygons in the dilated bounding box from design data for the area of the wafer defined by the dilated bounding box.

8. The method of claim 1, wherein determining if the polygons in the pattern of interest match the polygons in the dilated bounding box is performed with all of the polygons in the pattern of interest.

9. The method of claim 1, wherein if the polygons in the pattern of interest are determined to match the polygons in the dilated bounding box, the method further comprises determining a coarse position of the defect with respect to a design for the wafer based on design coordinates for the polygons in the pattern of interest that match the polygons in the dilated hounding box.

10. The method of claim 1, wherein if the area of the extended bounding box intersects the area of interest associated with the hot spot, the method further comprises determining a fine position of the defect with respect to a design for the wafer based on 1) a spatial relationship between the area of the extended bounding box and the area of interest associated with the hot spot and 2) a position of the area of interest associated with the hot spot in the design.

11. The method of claim 1, wherein if the defect is classified as the non-hot spot defect, the method further comprises eliminating information for the defect from information included in inspection results for the wafer.

12. The method of claim 1, wherein if the defect is classified as the non-hot spot defect, the method further comprises comparing a distance between the position of the defect and the next closest hot spot to a threshold and if the distance is less than the threshold, performing the method for the defect and the next closest hot spot.

13. The method of claim 1, wherein acquiring the information for the defect detected on the wafer comprises acquiring the information for the defect from an inspection system that detected the defect on the wafer.

14. The method of claim 1, wherein the position of the defect on the wafer is a position reported by an inspection system that detected the defect on the wafer, and wherein a coordinate inaccuracy of the inspection system is smaller than a height and a width of the hot spot.

15. The method of claim 1, wherein creating the extended bounding box comprises determining dimensions of the extended bounding box based on an uncertainty in the position of the defect, and wherein the position of the defect is reported by an inspection system that detected the defect on the wafer.

16. The method of claim 1, wherein the area of the extended bounding box is approximately equal to an area of the pattern of interest.

17. The method of claim 1, wherein the polygons in the pattern of interest are selected from a design for the wafer by identifying polygons that can be uniquely identified in an area proximate the hot spot and minimizing a width and a height of an area that encloses the identified polygons.

18. The method of claim 1, wherein said acquiring the information for the defect detected on the wafer comprises performing an inspection on the wafer in which defects are detected without using information about hot spots for the wafer.

19. The method of claim 1, wherein said acquiring the information for the defect detected on the wafer comprises performing an inspection on the wafer in which information about hot spots for the wafer is used to determine care areas on the wafer in which the inspection is performed.

20. A non-transitory computer-readable medium, storing program instructions executable on a computer system for performing a computer-implemented method for classifying defects detected on a wafer, wherein the computer-implemented method comprises:

acquiring information for a defect detected on a wafer, wherein the information comprises a position of the defect on the wafer;

creating an extended bounding box surrounding the position of the defect;

dilating the extended bounding box in two dimensions in proportion to a width and a height of a pattern of interest for a hot spot closest to the position of the defect to create a dilated bounding box that includes polygons in an area of the wafer defined by the dilated bounding box; and determining if polygons in the pattern of interest match the polygons in the dilated bounding box;
   if the polygons in the pattern of interest are determined to not match the polygons in the dilated bounding box, classifying the defect as a non-hot spot defect; and
   if the polygons in the pattern of interest are determined to match the polygons in the dilated bounding box, determining if the area of the extended bounding box intersects an area of interest associated with the hot spot;
      if the area of the extended bounding box intersects the area of interest associated with the hot spot, classifying the defect as a hot spot defect; and
      if the area of the extended bounding box does not intersect the area of interest associated with the hot spot, classifying the defect as a non-hot spot defect.

21. A system configured to classify defects detected on a wafer, comprising:
   an inspection subsystem configured for:
      detecting a defect on a wafer; and
      generating information for the defect on the wafer, wherein the information comprises a position of the defect on the wafer; and
   a computer subsystem configured for:
      creating an extended bounding box surrounding the position of the defect;
      dilating the extended bounding box in two dimensions in proportion to a width and a height of a pattern of interest for a hot spot closest to the position of the defect to create a dilated bounding box that includes polygons in an area of the wafer defined by the dilated bounding box; and
      determining if polygons in the pattern of interest match the polygons in the dilated bounding box;
         if the polygons in the pattern of interest are determined to not match the polygons in the dilated bounding box, classifying the defect as a non-hot spot defect; and
         if the polygons in the pattern of interest are determined to match the polygons in the dilated bounding box, determining if the area of the extended bounding box intersects an area of interest associated with the hot spot;
            if the area of the extended bounding box intersects the area of interest associated with the hot spot, classifying the defect as a hot spot defect; and
            if the area of the extended bounding box does not intersect the area of interest associated with the hot spot, classifying the defect as a non-hot spot defect.

22. The system of claim 21, wherein the pattern of interest and the area of interest associated with the hot spot are determined by another system, and wherein the computer subsystem is further configured for acquiring information for the pattern of interest, the area of interest, and the hot spot from a storage medium in which the other system has stored the information.

23. The system of claim 21, wherein the computer subsystem is further configured for creating the extended bounding box, dilating the extended bounding box, and determining if the polygons in the pattern of interest match the polygons in the dilated bounding box without using design data for the wafer.

24. The system of claim 21, wherein the area of interest associated with the hot spot is located within the pattern of interest.

25. The system of claim 21, wherein the area of interest associated with the hot spot is not located within the pattern of interest.

26. The system of claim 21, wherein determining if the polygons in the pattern of interest match the polygons in the dilated bounding box comprises extracting the polygons in the dilated bounding box from an image for the area of the wafer defined by the dilated bounding box, and wherein the image is generated by the inspection subsystem.

27. The system of claim 21, wherein determining if the polygons in the pattern of interest match the polygons in the dilated bounding box comprises extracting the polygons in the dilated bounding box from design data for the area of the wafer defined by the dilated bounding box.

28. The system of claim 21, wherein determining if the polygons in the pattern of interest match the polygons in the dilated bounding box is performed with all of the polygons in the pattern of interest.

29. The system of claim 21, wherein if the polygons in the pattern of interest are determined to match the polygons in the dilated bounding box, the computer subsystem is further configured for determining a coarse position of the defect with respect to a design for the wafer based on design coordinates for the polygons in the pattern of interest that match the polygons in the dilated bounding box.

30. The system of claim 21, wherein if the area of the extended bounding box intersects the area of interest associated with the hot spot, the computer subsystem is further configured for determining a fine position of the defect with respect to a design for the wafer based on 1) a spatial relationship between the area of the extended bounding box and the area of interest associated with the hot spot and 2) a position of the area of interest associated with the hot spot in the design.

31. The system of claim 21, wherein if the detect is classified as the non-hot spot defect, the computer subsystem is further configured for eliminating information for the defect from information included in inspection results for the wafer.

32. The system of claim 21, wherein if the defect is classified as the non-hot spot defect, the computer subsystem is further configured for comparing a distance between the position of the defect and the next closest hot spot to a threshold and if the distance is less than the threshold, performing creating the extended bounding box, dilating the extended bounding box, and determining if the polygons in the pattern of interest match the polygons in the dilated bounding box for the defect and the next closest hot spot.

33. The system of claim 21, wherein a coordinate inaccuracy of the inspection subsystem is smaller than a height and a width of the hot spot.

34. The system of claim 21, wherein creating the extended bounding box comprises determining dimensions of the extended bounding box based on an uncertainty in the position of the defect.

35. The system of claim 21, wherein the area of the extended bounding box is approximately equal to an area of the pattern of interest.

36. The system of claim 21, wherein the polygons in the pattern of interest are selected from a design for the wafer by identifying polygons that can be uniquely identified in an area proximate the hot spot and minimizing a width and a height of an area that encloses the identified polygons.

37. The system of claim 21, wherein the inspection subsystem is further configured for detecting the defect without using information about hot spots for the wafer.

38. The system of claim 21, wherein the inspection subsystem is further configured for detecting the defect by performing an inspection on the wafer in which information about hot spots for the wafer is used to determine care areas on the wafer in which the inspection is performed.

39. A method for detecting defects on a wafer, comprising:
identifying pattern of interest on a wafer in output for the wafer generated by a detector of an inspection system, wherein the pattern of interest and an area of interest are associated with a hot spot on the wafer, and wherein the pattern of interest and the area of interest have a fixed spatial relationship;
identifying a location of the area of interest in the output based on a location of the pattern of interest in the output; and
detecting defects on the wafer using only the output corresponding to the area of interest, wherein identifying the pattern of interest and identifying the location are performed prior to detecting the defects, and wherein identifying the pattern of interest, identifying the location, and detecting the defects are performed by one or more computer systems.

40. The method of claim 39, wherein the area of interest is within the pattern of interest.

41. The method of claim 39, wherein the area of interest is outside of the pattern of interest.

42. The method of claim 39, wherein an area of the pattern of interest is smaller than an area of the area of interest.

* * * * *